United States Patent

[11] 3,582,754

| [72] | Inventors | Gunther Hoffmann<br>Einengen unter Achalm;<br>Heinz Baumann, Dettingen ander Erms,<br>both of, Germany |
|---|---|---|
| [21] | Appl. No. | 798,026 |
| [22] | Filed | Feb. 10, 1969 |
| [45] | Patented | June 1, 1971 |
| [73] | Assignee | Wandel u. Goltermann Elektronische<br>Prazisionsmessgerate<br>Postfah 259, Reuttingen, Germany |
| [32] | Priority | Feb. 10, 1968 |
| [33] | | Germany |
| [31] | | P 16 38 310.1 |

[54] DIRECT-CURRENT CONVERTER WITH OVERLOAD PROTECTION
17 Claims, 6 Drawing Figs.

[52] U.S. Cl. ................................................. 321/2,
321/2, 321/14, 321/18, 331/113, 331/117
[51] Int. Cl. ................................................... H02m 3/22,
H02p 13/16, H03b 11/00
[50] Field of Search.............................................. 331/117,
113.1; 321/2, 14, 45, 18; 307/150, 151

[56] References Cited
UNITED STATES PATENTS

| 2,965,856 | 12/1960 | Roesel........................... | 331/117X |
| 3,439,251 | 4/1969 | Schaefer........................ | 321/18X |
| 3,441,875 | 4/1969 | Shoh............................... | 331/117 |
| FOREIGN PATENTS | | | |
| 3,359 | 4/1963 | Japan............................. | 331/117 |
| 1,285,613 | 1/1962 | France........................... | 321/45 |

*Primary Examiner*—William H. Beha, Jr.
*Attorney*—Karl F. Ross

ABSTRACT: A pair of switching transistors, serially connected across a common DC source, have a junction returned to one of the source terminals through the primary of an output transformer in series with the primary of a control transformer and with a frequency-selective network which includes a blocking capacitor and discriminates against frequencies above a predetermined switching frequency established either by the network itself or by a tuned secondary circuit of the control transformer.

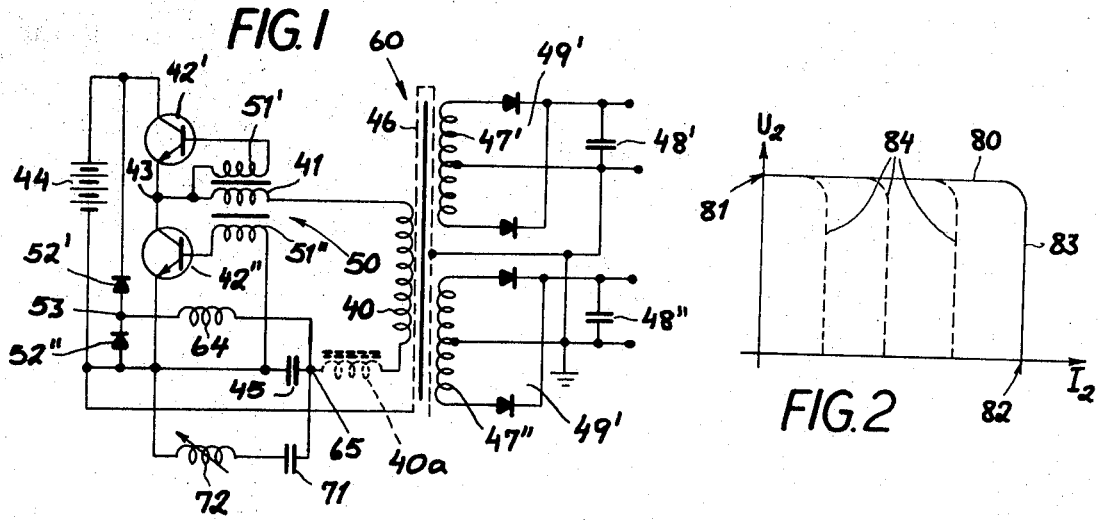
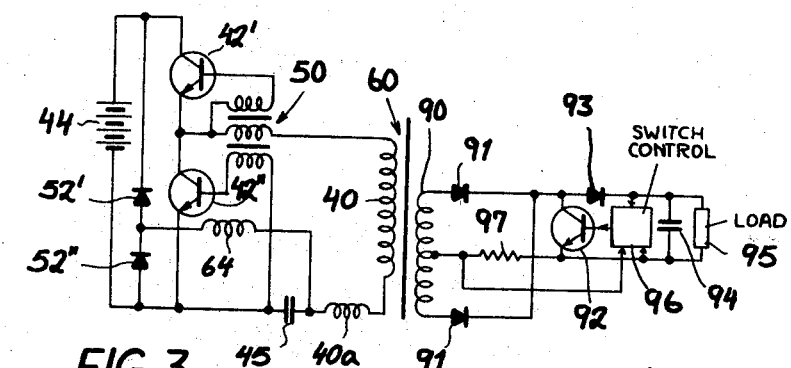
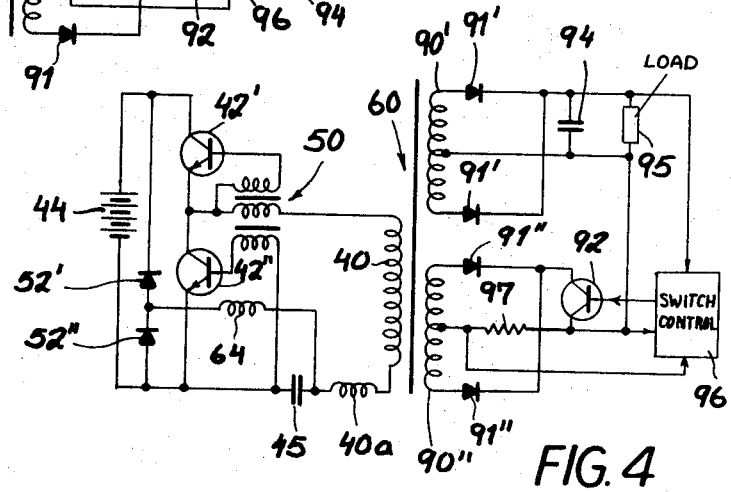
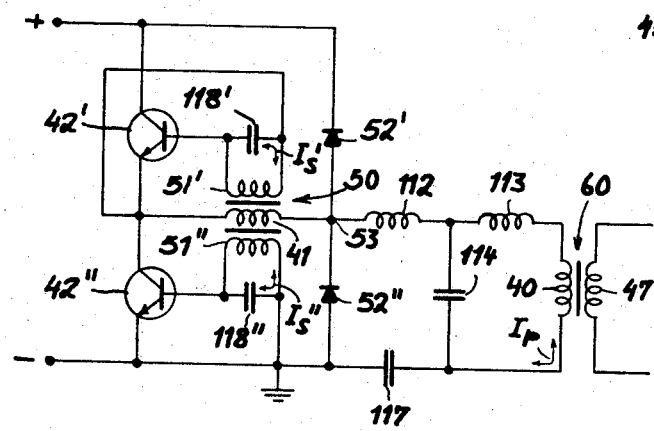
Günther Hoffmann
Heinz Baumann
INVENTORS.
BY
Karl F. Ross
Attorney

DIRECT-CURRENT CONVERTER WITH OVERLOAD PROTECTION

Our present invention relates to a direct-current converter of the type wherein a pair of switching transistors are serially connected across a source of direct current and are alternately biased into conductivity so as to generate a square wave which, e.g. after a suitable voltage transformation, can be reconverted into direct current or can be filtered to produce a substantially sinusoidal alternating current. Reference may be made in this connection, by way of example, to U.S. Pat. Nos. 2,968,738 and 3,026,486 showing the use of such systems as direct-current transformers or as oscillation generators.

A common and not always desirable characteristic of such converters is the substantial constancy of their output voltage in the face of varying load impedances. One drawback of this property is the inability of the system to respond to conventional voltage-regulating means designed, for example, to maintain a constant output current rather than output voltage upon changes in load impedances. A particularly marked disadvantage arises where the load impedance is liable to assume very low values or where actual short circuits are possible, since in such cases the large current drawn by the system may have a destructive effect.

It is, therefore, an object of our invention to provide a converter of the general type referred to in which these inconveniences are obviated.

Another important object of this invention is to provide improved circuitry for controlling the switchover of the transistors without the need for special taps or secondary feedback windings on the output transformer.

A further object, allied with the preceding one, is to provide means for so controlling the switchover as to avoid any risk of short circuit of the DC source due to overlapping conductivity of the two transistors which might occur in conventional systems on account of the finite sweep-out time required to turn off a transistor.

In accordance with the present invention, we return the junction of the two switching transistors to one of the terminals of the source by way of an alternating-current circuit which includes, besides the primary winding of the output transformer, a network discriminating against frequencies above the fundamental switching frequency whereby harmonics of that frequency, inherent in the square wave form, are suppressed so that a substantially sinusoidal oscillation traverses the output transformer; this oscillation is also transmitted through the primary of a control transformer lying in series with that of the output transformer, the same circuit including a blocking capacitor which may be part of the discriminating network and which prevents the direct discharge of the DC source by way of the two primaries. The secondary circuit of the control transformer has two branches, one for each switching transistor, which each span a control electrode (e.g. the base) and another electrode of the respective transistor to bias it into a conductive state during a fraction of an operating cycle. This fraction may be slightly less than a half-cycle of the switching frequency if, as described in greater detail hereinafter, the discriminating network and the secondary branches of the control transformer are tuned to slightly different frequencies.

The discriminating network may be a series-resonant circuit tuned to the switching frequency; in this case, no special tuning of the branches of the secondary circuit of the control transformer may be necessary. In a more elaborate system, the network is a low-pass or band-pass filter having a cutoff at or just above the switching frequency to suppress its harmonics; in that instance the precise operating frequency within the pass band of the filter may be chosen by connecting a tuning condenser across each secondary of the control transformer. In either case, the network can be characterized by the fact that its reactance is positive (i.e. inductive) for frequencies greater than the switching frequency. With the network designed as a T-section having a predominantly inductive series branch and a predominantly capacitive shunt branch, each half of the series branch may substantially resonate the shunt branch at the switching frequency; a slight relative detuning of the two branches can be advantageous, however, as described hereinafter.

According to another desirable feature of our invention, the discriminating network includes the leakage inductance of the primary of the output transformer so as to simplify the construction of that transformer and to minimize the problem of shielding. In a particularly simple case, therefore, this network consists only of the blocking capacitor resonating the aforementioned leakage inductance.

The above and other features of our invention will become more fully apparent from the following detailed description of certain embodiments, reference being made to the accompanying drawing in which:

FIG. 1 is a circuit diagram of a converter embodying the invention;

FIG. 2 is a set of graphs relating to the system of FIG. 1;

FIGS. 3 and 4 are views similar to FIG. 1, illustrating certain modifications;

FIG. 5 is a further view similar to FIG. 1, illustrating yet another embodiment.

Figure 6:
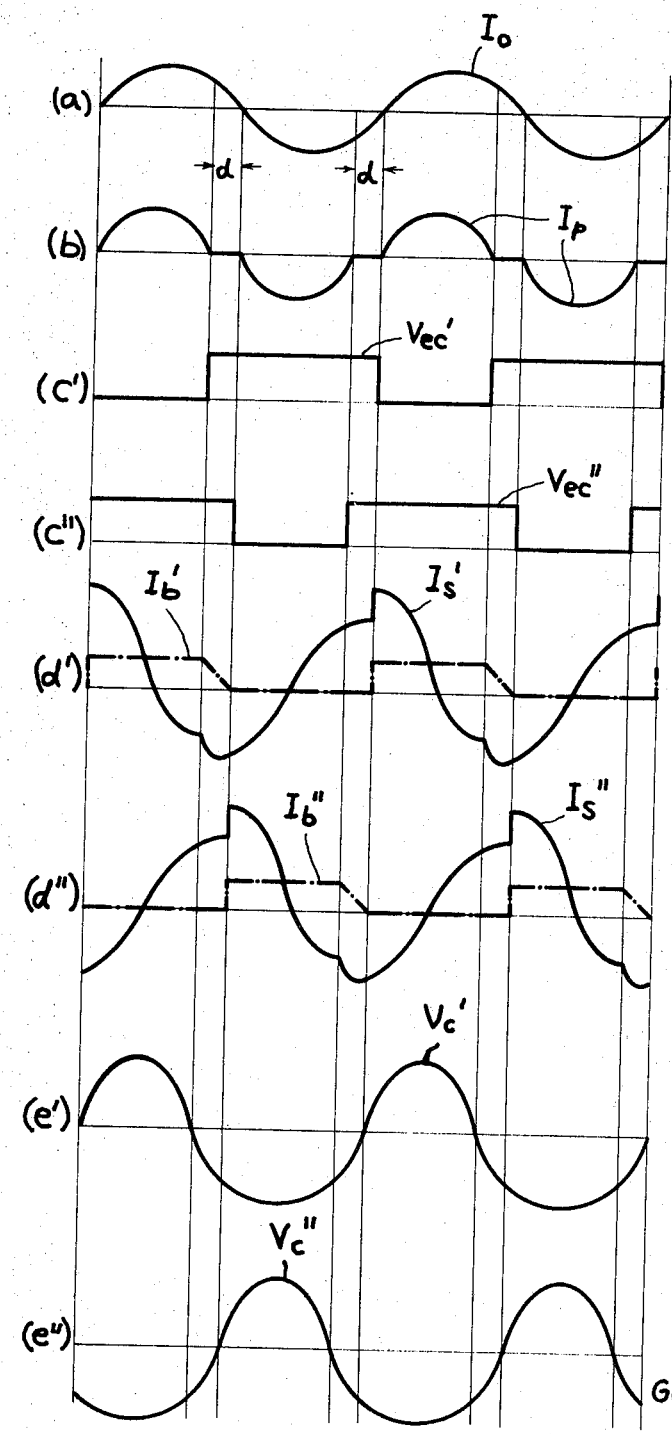
FIG. 6 is a set of graphs relating to the operation of the system of FIG. 5.

In FIG. 1 we have shown a converter comprising a pair of switching transistors 42, 42'' having their emitters and collectors serially connected to a source 44 of direct current. The junction 43 of the collector of transistor 42'' and the emitter of transistor 42' is connected through a secondary 51' of a control transformer 50 to the base of transistor 42', the base of the other transistor 42'' being connected to the negative terminal of source 44 through the other secondary 51'' of that transformer. An AC circuit extends from junction 43 via the primary 41 of transformer 50, the primary 40 of an output transformer 60, an inductance 40a and a blocking capacitor 45 to negative battery; inductance 40a, shown in dotted lines, need not be present as a physical impedance but may be constituted by the leakage inductance of primary 40.

Two diodes 52', 52'' are serially connected, in their blocking direction, across source 44 and have a common terminal 53 from which a connection including an inductance 64 extends to a point 65 between capacitor 45 and primary 40. The capacitor is also shunted by a current path including an auxiliary condenser 71 and an adjustable inductance 72, e.g. a transductor whose control winding has not been illustrated.

The load circuit supplied by transformer 60 comprises two secondary windings 47', 47'' each working into a respective full-wave rectifier 49', 49'', each rectifier also including a respective smoothing condenser 48', 48''. The midpoints of the secondaries 47', 47'' are connected to the grounded negative terminal of source 44 and to a shield 46 for the core of transformer 60, no particular restriction being placed on the size of the shield since the leakage inductance of primary 40 (included in impedance 40a) is resonated by the capacitor 45 and serves a useful function in the circuit.

In operation, a transient (resulting, for example, from closure of the input circuit) will bias the base of either transistor, e.g. transistor 42', into conductivity so that substantially the full battery voltage is developed across the circuit composed of impedances 41, 40, 40a and 45. Owing to the series-resonant network 40a, 45, a sinusoidal current begins to flow in the two transformers 50, 60, the feedback through secondary 51' causing transistor 42' to saturate for a period substantially corresponding to half a cycle of the switching frequency established by network 40a, 45. At the end of this half-cycle transistor 42' cuts off and transistor 42'' starts conducting for another half-cycle.

If the load impedance drops to a low value or the load is short-circuited, the oscillations in the primary circuit could build up to considerable peak voltages if the inductive connection between points 53 and 65 where omitted. The presence of this connection, however, ensures that neither the positive nor the negative peak can appreciably surpass the voltage of the battery 44; thus, if point 65 were driven more positive than the positive terminal of battery 44, diode 52' would conduct to connect the capacitor 55 directly across the battery, and diode 52" would short circuit the capacitor if the potential of point 65 were negative with reference to ground. This would be so even if inductance 64 were of small magnitude or omitted entirely; without this inductance, however, the partial discharge of the overdriven capacitor 45 would result in a lowering of the operating frequency, for which reason we prefer to include this inductance and to make its reactance substantially equal and opposite to that of the capacitor so that this discharge will also occur in the rhythm of the selected switching frequency.

The adjustable reactance 72, in series with blocking condenser 71 whose impedance at the operating frequency is insignificant, shunts a portion of the circulating primary current away from winding 40 (as well as from the actual or simulated inductance 40a) so as to reduce the available driving voltage for the load. The effect of this optional impedance has been illustrated in FIG. 2 where the output voltage $U_2$ has been plotted against the output current $I_2$. The graph shown in full lines relates to the case in which the shunt path 71, 72 has been open-circuited and is seen to comprise a horizontal branch 80, starting at a point 81 on the ordinate $U_2$, and a vertical branch 83, terminating at a point 82 on the abscissa $I_2$. This signifies a virtually constant output voltage until the load current approaches its maximum value represented by point 82, whereupon the load voltage drops to zero. If, however, inductance 72 is operatively connected and adjusted to different values, the vertical branch 83 is replaced by one of several branches 84, shown in dotted lines, which represent different magnitudes of the maximum output current $I_2$.

In FIGS. 3 and 4, in which elements corresponding to those of FIG. 1 have been designated by the same reference numerals, we have shown a modified load circuit including means for periodically short-circuiting the secondary side of output transformer 60 during a portion of each operating cycle in order to compensate for deviations of the load voltage from a desired magnitude. In FIG. 3, where the load has been indicated at 95, output transformer 60 has a single secondary winding 90 working into a full-wave rectifier circuit represented by a pair of diodes 91 and a smoothing condenser 94 connected across the load. An ancillary transistor 92 has its collector and emitter bridged across the rectifier circuit, ahead of condenser 94, and has its base tied to an output of a control circuit 96 adapted to switch this transistor into a conductive state. Circuit 96 has two inputs connected across a sensing impedance 97, here shown as a resistor, lying in the return lead to the midpoint of secondary 90. This input connection detects the zero point of the raw-rectified current passed by the diodes 91, circuit 96 having a further input connecting it across elements 94 and 95 so as to apply the load voltage directly to this circuit. A diode 93, inserted between the collector of transistor 92 and the last-mentioned input of circuit 96, decouples the latter from the fluctuating voltage in the common output of diodes 91.

Control circuit 96 compares the load voltage across condenser 94 with a predetermined standard and, in response to any deviation, generates a set of pulses in the rhythm of the switching frequency to unblock the transistor 92 for a fraction of each half-cycle, the zero pulses from resistor 97 determining either the beginning or the end of each unblocking pulse. It will be understood that the load voltage may at most be as high as the standard whereupon the unblocking pulses would disappear. Reference may be made, by way of example, to U.S. Pat. Nos. 3,088,075 and 3,207,931 showing suitable circuits, including magnetic amplifiers, for generating such pulses.

The system of FIG. 4 differs from that of FIG. 3 in that the transformer 60 is here shown provided with two secondary windings 90', 90" working into respective full-wave rectifiers 91', 91", the load 95 together with its smoothing condenser 94 being connected in the output of rectifier 91'. Sensing resistor 97, on the other hand, is now connected in circuit with winding 90", as is the ancillary transistor 92 controlled by circuit 96. Thus, the operation of this system differs from that of FIG. 3 in that only a part of the secondary side of transformer 60 is short-circuited by the transistor 92 in response to a pulse from controller 96; the use of two separate secondary windings affords greater freedom in the dimensioning of the windings to suit the requirements of the transistor 92 and the load 95.

Elements 71 and 72 of FIG. 1, while not shown in FIGS. 3 and 4, could of course also be included in the latter system; on the other hand, these and other elements (e.g. inductance 64) could be omitted in any of the aforedescribed converters if overload protection or adjustability is not required.

The system of FIG. 5 utilizes a low-pass filter, comprising a pair of series inductances 112, 113 and a shunt capacitance 114, as part of the discriminating network which also includes a blocking capacitor 117 of relatively low impedance at the operating frequency. The common terminal 53 of diodes 52', 52" is here disposed between the series branch 112, 113 of the T-section 112—114 and the primary 41 of control transformer 50. Secondaries 51', 51" of the latter transformer are shunted by respective condensers 118', 118" which resonate then at the selected switching frequency.

It may be assumed, for present purposes, that the inductances $L_1$ and $L_2$ of coils 112 and 113 are substantially equal to each other and that each of them resonates the capacitor 114 at the switching frequency. It will then be readily apparent that any short-circuiting of the secondary 47 of transformer 60, and therefore of its primary 40, will effectively convert the pad 112—114 into a parallel-resonant circuit 113, 114, tuned to the switching frequency, connected in series with the inductance 112; thus the input impedance of the AC circuit of FIG. 5 becomes substantially infinite in this case. On the other hand, any open-circuiting of transformer 60 would terminate the AC circuit in a series-resonant network 112, 114 of substantially zero impedance at the operating frequency, yet the finite resistance of the other circuit elements together with the peak-limiting effect of the diodes 52', 52" would prevent overload even under these circumstances.

If the reactances 112, 114 do not precisely resonate at the operating frequency, overvoltages under no-load conditions are further reduced. Such detuning of the left-hand half of network 112—114 is also desirable for the purpose of protecting the system from a short circuit due to simultaneous conduction of transistors 42' and 42". Because of the finite time lag required for terminating the conductive state of a transistor upon the discontinuance of its base current, such overlapping conduction could occur if one transistor were turned on at precisely the instant when the other is being turned off. If, however, the section of network 112, 114 proximal to primary 41 is tuned to resonate at a frequency somewhat higher than the switching frequency established by the tuning of circuits 51', 118' and 51", 118", the period of conductivity of the transistors will become slightly shorter than a half-cycle so that such short circuit will be positively prevented. This has been illustrated in FIG. 6 where graph (a) shows the output current $I_o$ traversing the transformer primary 40; graph (b) represents the primary current $I_p$ flowing in winding 41, with graphs (c') and (c") indicating the emitter-collector voltages $V_{ec}'$, $V_{ec}''$ of transistors 42', 42", respectively. Graphs (d") show the approximate flow of secondary currents $I_s'$, $I_s''$ in windings 51' and 51", respectively, while graphs (e') and (e") illustrate the voltage swings $V_c'$ and $V_c''$ on condensers 118', 118", respectively. In graphs (d') and (d") we have also indicated, in dotted lines, the base currents $I_b'$ and $I_b''$ of transistors 42' and 42".

It will be thus seen that a delay $d$ exists between the cessation of current flow through winding 41 and the beginning of reverse flow at the start of the next cycle, this interval $d$ enabling the base currents $I_b'$, $I_b''$ to decay to zero. During the nonconductive period of each transistor, the charging of the corresponding condenser 118', 118" is controlled solely by the tuning of the respective branch of the secondary circuit of transformer 50. The reactive currents flowing through the primary circuit in the delay period $d$ are drawn from capacitor 117 via diode 52'' in one half-cycle and are returned to the DC source (not shown in FIG. 5) via diode 52' in the other half-cycle, this being the reverse of the flow path which energizes the output transformer 60 during the remainder of the cycle.

The diagram of FIG. 2 is also applicable to the converter of FIG. 5, with curves 83, 84 representing the output voltage at maximum output current for different input voltages or primary currents.

We claim:

1. A direct-current converter comprising a source of direct current; a first switching transistor and a second switching transistor serially connected across said source and forming a junction therebetween, each of said transistors being provided with several electrodes including a control electrode; a control transformer and an output transformer having respective primary windings serially connected between said junction and a terminal of said source in an alternating-current circuit also including a network discriminating against frequencies above a predetermined switching frequency, said control transformer being provided with a secondary circuit having two branches each connected across said control electrode and another electrode of a respective transistor for alternately biasing said transistors into conductivity in the rhythm of said switching frequency, at least one of said circuits being tuned to said switching frequency; a load circuit connected to be energized from said output transformer; and a pair of diodes serially connected in a blocking direction across said source, said diodes having a common terminal tied to said junction by way of an inductive connection including at least one of said primary windings for limiting the magnitude of peak voltages developed thereacross.

2. A converter as defined in claim 1 wherein said network includes a blocking capacitor, said common terminal being tied by an essentially reactive connection to a point of said network between said capacitor and the primary winding of said output transformer.

3. A converter as defined in claim 2 wherein said reactive connection includes an inductance substantially resonating said capacitor at said switching frequency.

4. A converter as defined in claim 3, further comprising a shunt path of variable reactance bridging said capacitor.

5. A converter as defined in claim 1 wherein at least a section of said network is tuned to said switching frequency.

6. A converter as defined in claim 5 wherein said section includes the leakage inductance of the primary winding of said output transformer.

7. A converter as defined in claim 5 wherein said section includes a blocking capacitor.

8. A converter as defined in claim 1 wherein said network comprises a T-section with a predominantly inductive series branch and a predominantly capacitive shunt branch.

9. A converter as defined in claim 8 wherein said series branch has two halves each substantially resonating said shunt branch at said switching frequency.

10. A converter as defined in claim 9 wherein one of said halves includes the leakage inductance of the primary winding of said output transformer.

11. A converter as defined in claim 10 wherein the other of said halves resonates said shunt branch at a frequency slightly higher than said switching frequency.

12. A converter as defined in claim 9 wherein each branch of said secondary circuit includes a transformer winding and a condenser resonating same substantially at said switching frequency.

13. A converter as defined in claim 8 wherein said network includes a blocking capacitor of relatively low impedance at said switching frequency in series with said T-section.

14. A converter as defined in claim 1 wherein said load circuit includes load-controlled switch means for periodically short-circuiting at least part of said load circuit during each switching cycle to maintain a substantially constant load voltage.

15. A converter as defined in claim 14 wherein said load circuit comprises rectifier means and a normally blocked ancillary transistor connected across the output of said rectifier means, said switch means being coupled to said ancillary transistor for periodically unblocking same.

16. A converter as defined in claim 15, further comprising a sensing impedance in the output of said rectifier means, said switch means having input connections across said sensing impedance.

17. A converter as defined in claim 16 wherein said load circuit includes a first secondary winding and a second secondary winding of said output transformer, said first secondary winding being connected to energize a load, said rectifier means being connected across said second secondary winding.